July 29, 1924.  
F. H. SIBLEY  
OIL WELL PUMPER  
Filed Aug. 5, 1922

Frederick H. Sibley  
Inventor  
By his Attorneys Dodson & Roe

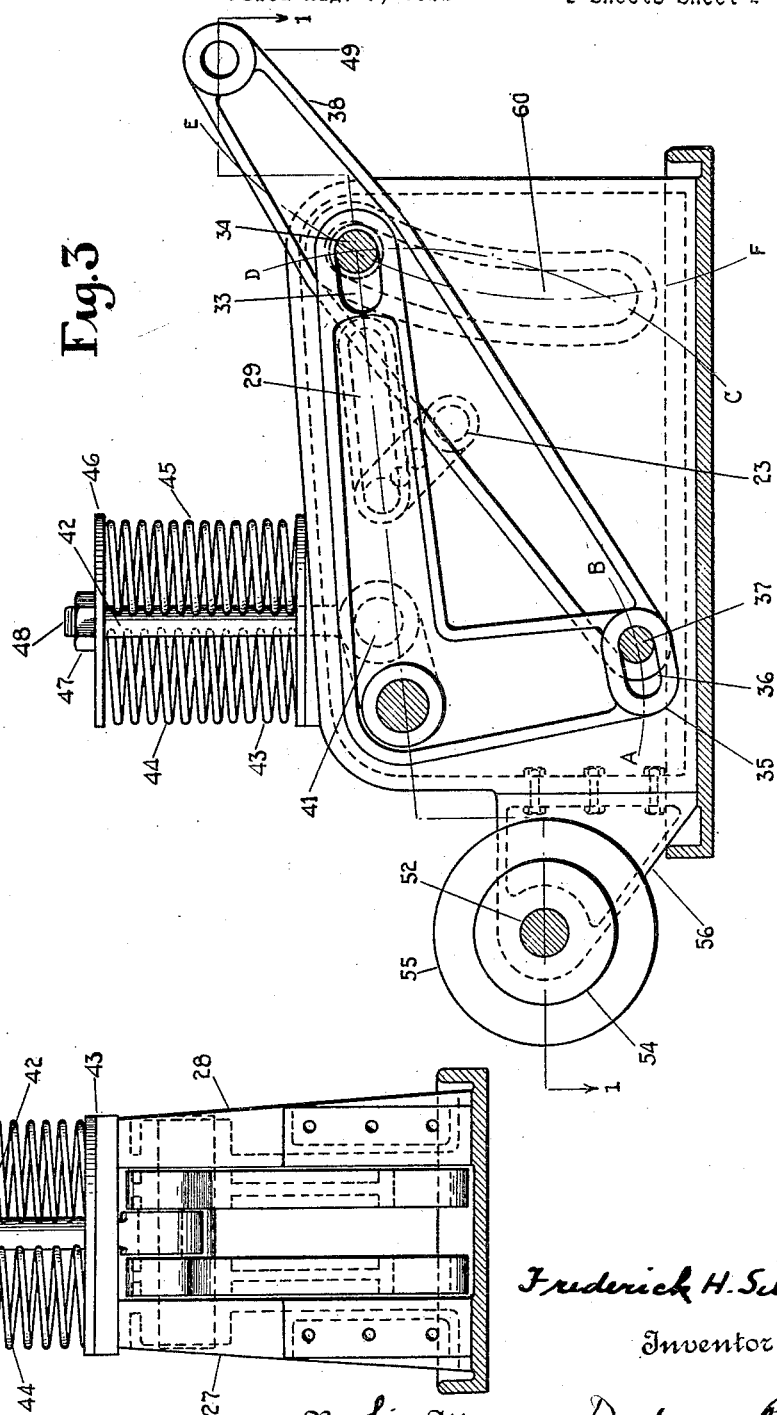

Patented July 29, 1924.

1,502,690

UNITED STATES PATENT OFFICE.

FREDERICK H. SIBLEY, OF RENO, NEVADA, ASSIGNOR TO MAXIMUM POWER CO., OF WILMINGTON, DELAWARE, A CORPORATION OF DELAWARE.

OIL-WELL PUMPER.

Application filed August 5, 1922. Serial No. 579,867.

*To all whom it may concern:*

Be it known that I, FREDERICK H. SIBLEY, a citizen of the United States, residing at Reno, county of Washoe and State of Nevada, have invented a certain new and useful Improvement in Oil-Well Pumpers, of which the following is a specification.

My invention is designed as an improvement upon the pumper described in my application Serial No. 372,425 and has for its object combine a straight line pumper with means for pulling a well and utilize one motor for both devices.

My means of accomplishing the foregoing object may be more readily understood by having reference to the accompanying drawings which are hereto annexed and are a part of this specification in which—

Fig. 3 is a side elevation.

Fig. 4 is an end elevation.

Similar reference numerals refer to similar parts throughout the entire description.

Figure 1:
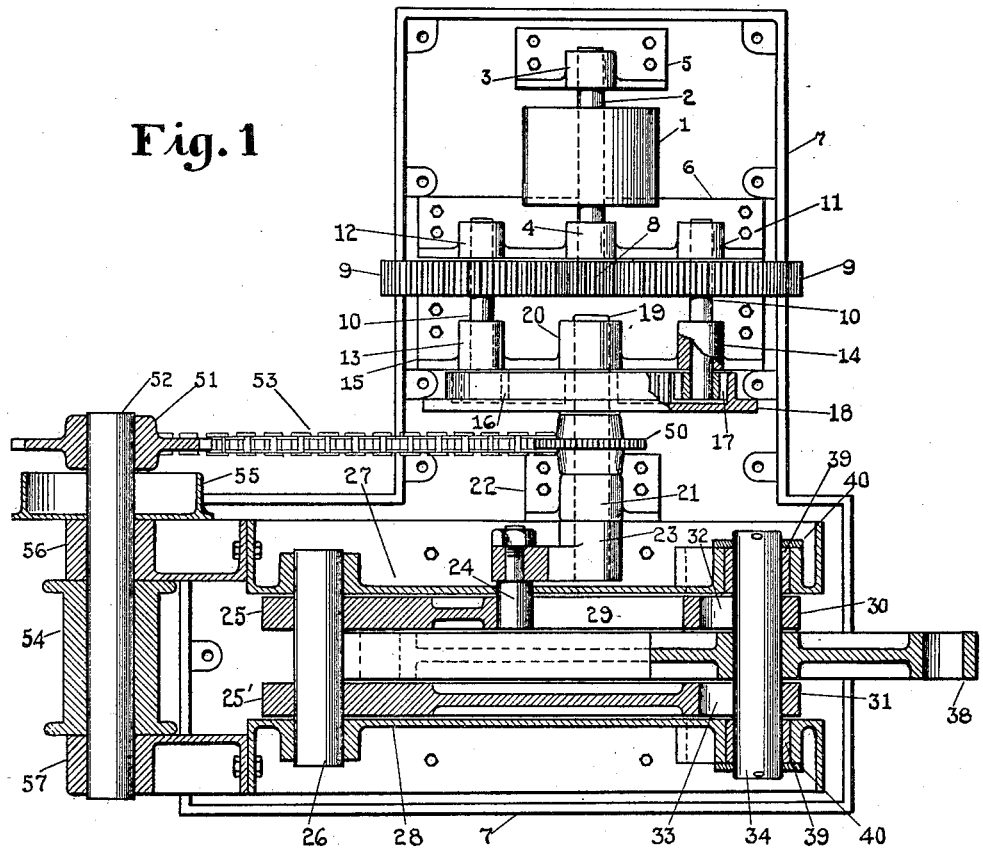
Fig. 1 is a top plan view of my improved pumping device.
Figure 2:
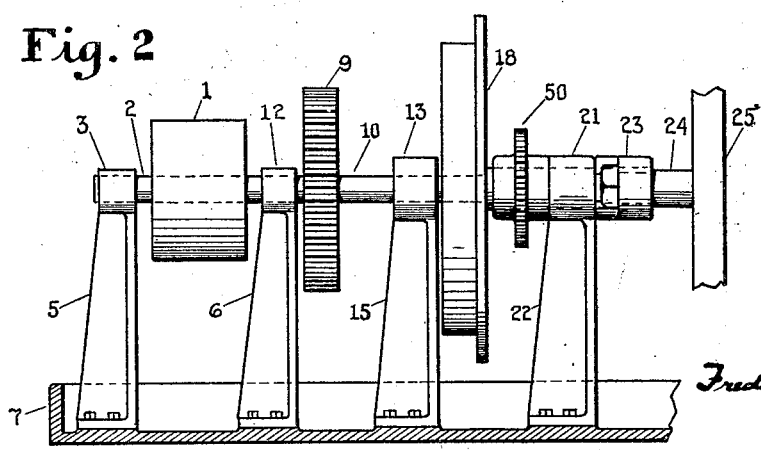
Fig. 2 is a side view of the reduction gear.

As shown in the drawings the device is driven through the medium of a pulley 1, which may be driven by an engine or motor, (not shown), the pulley is fixedly mounted upon a shaft 2 which is mounted in bearings 3 and 4 formed on brackets 5 and 6 which are bolted to the base plate 7 in the usual or customary manner. Upon the end of the shaft 2 is mounted a pinion 8, the teeth of which are in mesh with the teeth of a pair of spur gears 9 mounted upon shafts 10 carried by bearings 11 and 12 found in the bracket 6 and bearings 13 and 14 formed in a bracket 15 which is also bolted in the customary manner to the base plate 7. The shafts 10 are each provided with a pinion 16 and 17 which are in mesh with an annular internal master gear 18. Since these pinions 16 and 17 mesh with the master gear 18 at diametrically opposite points, it is obvious that they will rotate it in a uniform direction. The master gear 18 is fixed upon a shaft 19 which is carried by bearings 20 and 21 formed in the bracket 15 and a bracket 22 which is also bolted to the base plate 7. Upon the end of the shaft 19 is fastened a crank 23 which may be provided with a plurality of eyes at different radii to permit the adjustment of the throw of the crank pin 24 which is mounted in one of the eyes and thus enable one to vary the stroke of the pump rods. I provide a pair of bell cranks 25 and 25' which oscillate upon a gudgeon pin 26 carried in the main brackets 27 and 28 which is bolted to the base plate 7. The bell crank 25 has a slot 29 formed in one of its arms, in which is slidably mounted the crank pin 24 which moves in the slot so that as the crank pin 24 is rotated it will impart to the bell cranks 25 and 25' a rotative reciprocating motion about the center of the gudgeon pin 26. The ends 30 and 31 of the bell cranks are provided with slots 32 and 33 to receive the pin 34. The other ends 35 of the bell cranks are provided with slots 36 to receive the lower pin 37. Both of these pins 34 and 37 are fixed in the pump beam 38 in the positions shown. The ends of the pin 34 which are provided with rollers 39 which are held in position by washers 40 are slidably mounted in arcuate slots 60 formed in the main brackets 27 and 28. My means of balancing the load on the pump beam comprises a pin 41 which is mounted in the upper arms of the bell cranks adjacent the gudgeon pin 26. To this pin 41 I attach a rod 42. This rod carries a saddle 43 which may rest upon the main brackets 27 and 28. Upon the saddle 43 I mount four coil springs 44 and 45. These springs are held in place by a plate 46 which is secured by a nut 47 mounted upon the threaded end 48 of the pin 42. The operation of the pumper is as follows, the crank 23 being rotated through the gear train described causes the oscillation of the bell cranks 25 and 25' about the center of the gudgeon pin 26 as they oscillate the center of the lower pin 37 is forced to move in the arc AB and the center of the pin 34 moves normally in the arc CD but inasmuch as the pin 34 and the rollers 39 are carried by the arcuate slots 60 formed in the main brackets 27 and 28, the center of the pin is constrained to move in the arc EF. These arcs AB, CD and EF are so arranged that the outer end 49 of the pump beam 38 moves in an approximately straight line. The approximation in this particular operation is close enough to be within the limits of mechanical accuracy for machinery of this kind. The springs 44 and 45 may be designed to balance any desired load on the pump beam and should be made long enough so that they are not completely opened or closed under the working operations. Means for adjustment of the springs are provided by the nut 47, thus enabling the pumps to be used on wells of varying depth. For very shallow wells it may be found desirable to substitute weaker springs.

My improved means for pulling the wells comprises a sprocket 50 mounted upon the crank shaft wheel 19 and another sprocket wheel 51 mounted upon a drum shaft 52, a sprocket chain 53 connecting the two sprockets, upon the shaft 52 I mount a winding drum 54 and a brake drum 55. The shaft 52 is carried by brackets 56 and 57 which are bolted to the main brackets 27 and 28. The sprocket wheel 51 and the brake drum 55 may be provided with means to lock them together for pulling rods or unlocking them when lowering the rods.

By the gear train described I am able to obtain a very high gear reduction. For example;

The speed reduction of the transmission gear is 25 to 1. With the drive pinion 8, making 500 R. P. M. the crank makes 20 R. P. M.

The sprocket chain drive has a ratio of 2½ to 1. The sprocket being 8″ and the wheel approximately 20″ in diameter. The brake drum is 24″ in diameter and the pulling drum 8″. With a 10 H. P. motor, and allowing a safe overload for 3 minutes, the windlass will lift a load equal to 3000 ft. of 2″ tubing or 1600 ft. of 13 lb. casing, when started, at a speed of 16 ft. per minute. For pulling rods in shallow wells a small diameter sprocket wheel may be substituted for 51. With an 8″ sprocket wheel rods will be pulled at the rate of 40 ft. per minute. For very deep wells a larger wheel may replace 51. It is therefore possible to pull or pump wells covering any ordinary range of depth with a single motor. The only adjustments necessary for varying load, speed and stroke, being at the crank pin, the springs and the sprocket wheel as described.

Having described my invention, what I regard as new and desire to secure by Letters Patent is:

1. In an oil pumper a gear driven shaft, a crank on said shaft carrying a crank pin, a pair of bell cranks, a gudgeon pin about whose center said bell cranks oscillate, there being a slot in the arm of one of the bell cranks in which the crank pin slides, a pump beam, a pin in one end thereof which slides in a slot in the lower end of the bell cranks, a pin in the beam which passes through a slot formed in the end of the upper arm of the bell cranks, a pair of main brackets having arcuate slots therein in which said last named pin slides.

2. In an oil pumper a gear driven shaft, a crank on said shaft carrying a crank pin, a pair of bell cranks, a gudgeon pin about whose center said bell cranks oscillate, there being a slot in the arm of one of the bell cranks in which the crank pin slides, a pump beam, a pin in one end thereof which slides in a slot in the lower end of the bell cranks, a pin in the beam which passes through a slot formed in the end of the upper arm of the bell cranks, a pair of main brackets having arcuate slots therein in which said last named pin slides, a pin in the bell cranks adjacent the gudgeon pin, a rod mounted therein, a saddle resting on said main brackets through which the rod passes, a pair of coil springs on said saddle, a plate to hold said springs in position and means to adjust the tension thereof.

3. In an oil pumper a gear driven shaft, a crank on said shaft carrying a crank pin, a pair of bell cranks, a gudgeon pin about whose center said bell cranks oscillate, there being a slot in the arm of one of the bell cranks in which the crank pin slides, a pump beam, a pin in the end thereof which slides in a slot in the lower end of the bell cranks, a pin in the beam which passes through a slot formed in the end of the upper arm of the bell cranks, a pair of main brackets having arcuate slots therein in which said last named pin slides, a sprocket on the crank shaft, a pair of brackets bolted to the main brackets, a shaft mounted therein, a sprocket wheel on said shaft, a sprocket chain to connect the two sprockets, a brake drum fixed on the shaft adjacent the sprocket wheel and a winding drum on said shaft.

4. In an oil pumper a base plate, a gear driven shaft, bearings on which said shaft is mounted, a crank on said shaft carrying a crank pin, a pair of bell cranks, a gudgeon pin about whose center said bell cranks oscillate, there being a slot in the arm of one of the bell cranks in which the crank pin slides, a pump beam, a pin in one end thereof which slides in a slot in the lower end of the bell cranks, a pin in the beam which passes through a slot formed in the end of the upper arm of the bell cranks, a pair of main brackets having arcuate slots therein in which said last named pin slides.

5. In an oil pumper a gear driven shaft, a crank on said shaft carrying a crank pin, a pair of bell cranks, a gudgeon pin about whose center said bell cranks oscillate, there being a slot in the arm of one of the bell cranks in which the crank pin slides, a pump beam, a pin in one end thereof which slides in a slot in the lower end of the bell cranks, a pin in the beam which passes through a slot formed in the end of the upper arm of the bell cranks, a pair of main brackets having arcuate slots therein in which said last named pin slides, a plurality of coil springs in arrangement with the bell cranks whereby their oscillation serves to expand and contract said springs.

6. In an oil pumper a gear driven shaft, a crank on said shaft carrying a crank pin, a pair of bell cranks, a gudgeon pin about whose center said bell cranks oscillate, there being a slot in the arm of one of the bell cranks in which the crank pin slides, a pump beam, a pin in one end thereof which slides in a slot in the lower end of the bell cranks, a pin in the beam which passes through a slot formed in the end of the upper arm of the bell cranks, a pair of main brackets having arcuate slots therein in which said last named pin slides, a plurality of coil springs in arrangement with the bell cranks whereby their oscillation serves to expand and contract said springs, a winding drum, a shaft to which said drum is secured, bearings for said shaft and means to rotate said drum, said means being driven by the gear driven shaft and means to retard or prevent the rotation of said winding drum.

In testimony whereof, I have signed the foregoing specification.

FREDERICK H. SIBLEY.